United States Patent [19]

Vogel

[11] Patent Number: 4,609,086
[45] Date of Patent: Sep. 2, 1986

[54] FRICTION CLUTCH
[75] Inventor: Manfred Vogel, Kappelrodeck, Fed. Rep. of Germany
[73] Assignee: Luk Lamellen und Kupplungsbau GmbH, Bühl, Fed. Rep. of Germany
[21] Appl. No.: 651,395
[22] Filed: Sep. 14, 1984
[30] Foreign Application Priority Data
Sep. 14, 1983 [DE] Fed. Rep. of Germany ....... 3333181
[51] Int. Cl.$^4$ .................. F16D 13/71; F16D 13/40
[52] U.S. Cl. ................. 192/70.27; 192/89 B; 192/109 R
[58] Field of Search .............. 192/70.13, 70.27, 89 B, 192/109 R, 109 A

[56] References Cited
U.S. PATENT DOCUMENTS
2,138,169 11/1938 Hunt ........................... 192/70.27

FOREIGN PATENT DOCUMENTS
3234156 3/1984 Fed. Rep. of Germany.
3303875 8/1984 Fed. Rep. of Germany.
1394118 5/1975 United Kingdom ............ 192/109 R Primary Examiner—Rodney H. Bonck
Assistant Examiner—Richard M. Lorence
Attorney, Agent, or Firm—Peter K. Kontler

[57] ABSTRACT

A friction clutch wherein the prestressed diaphragm spring has prongs extending outwardly from its annular main section and being separably affixed to the counterpressure plate by an annulus of screws. The spring bears against the pressure plate and urges the latter against the clutch plate which is thereby biased against the counterpressure plate. When the screws are removed, the prestressed spring is axially shifted relative to the pressure plate and lugs on its prongs come into engagement with a radial shoulder of the pressure plate to hold the spring against further axial movement relative to the pressure plate as well as to maintain the diameter of the circle formed by the centers of holes in the prongs at least substantially unchanged. This simplifies the reattachment of prongs to the counterpressure plate. The prongs tend to move radially inwardly and abut against a cylindrical surface of the pressure plate when they are detached from the counterpressure plate.

34 Claims, 4 Drawing Figures

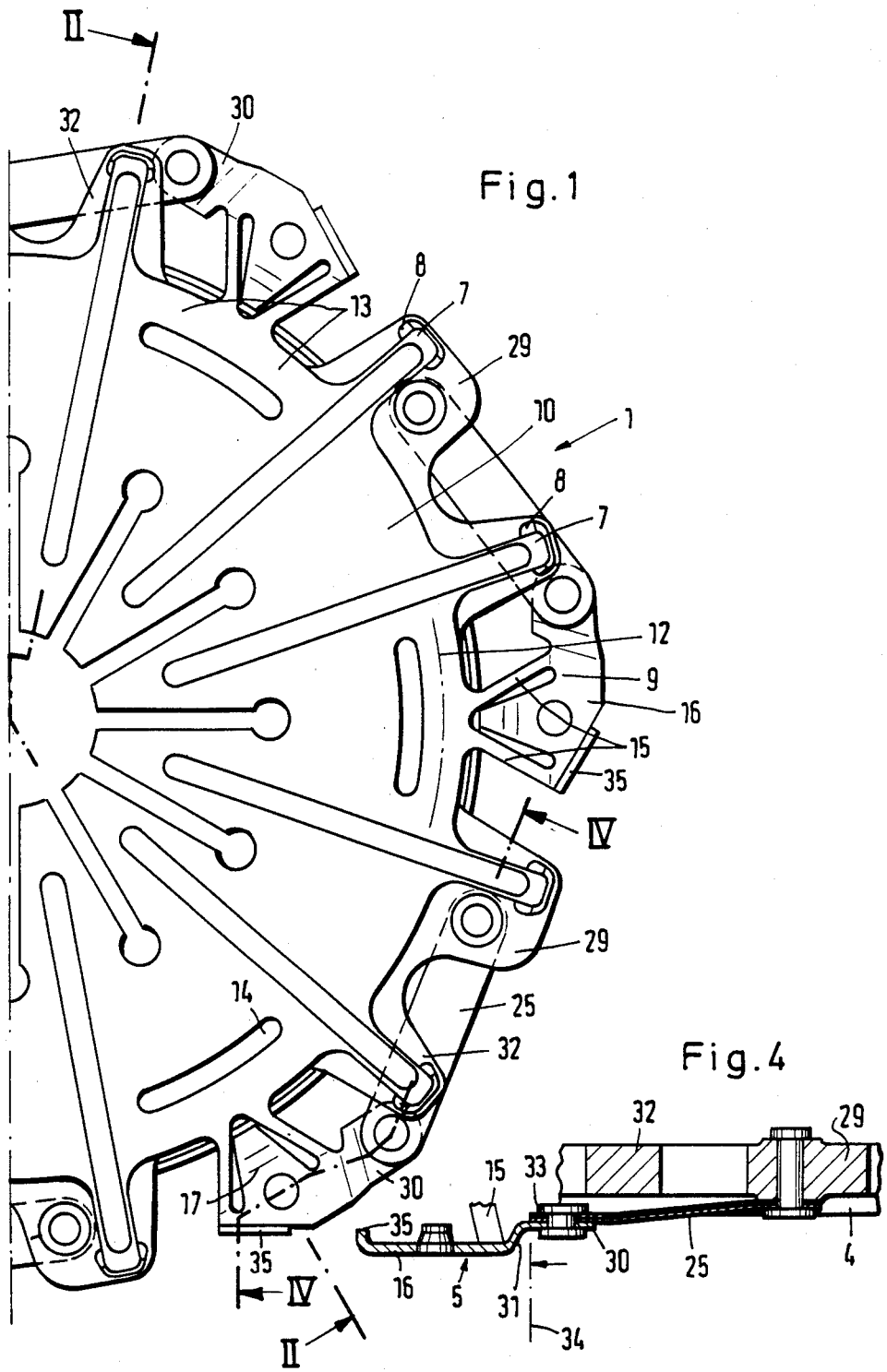

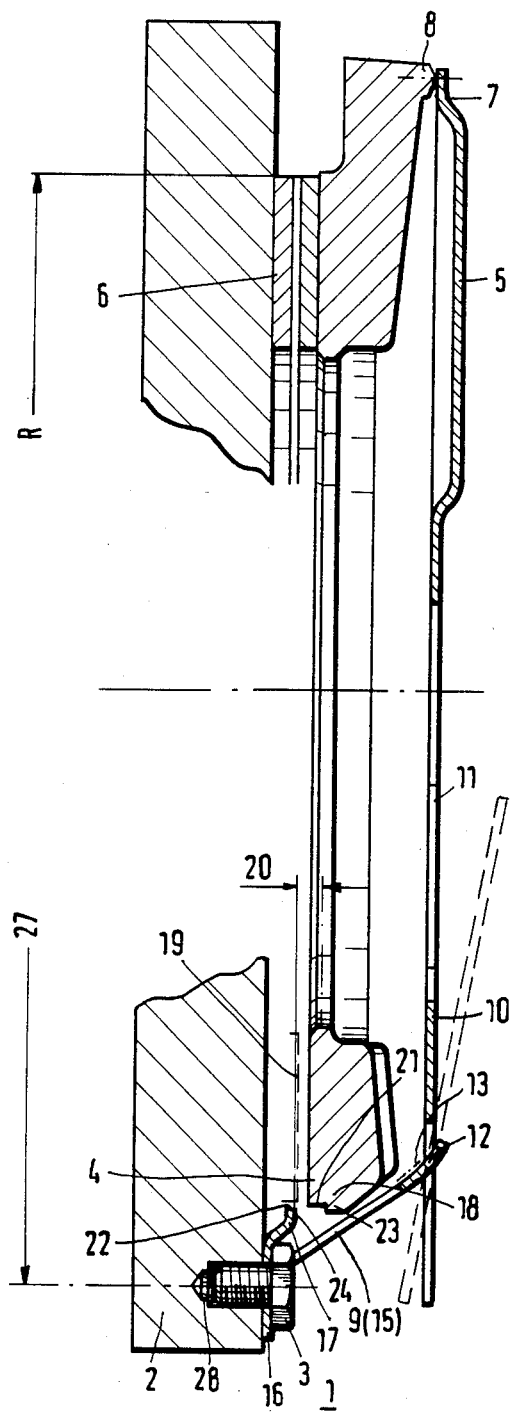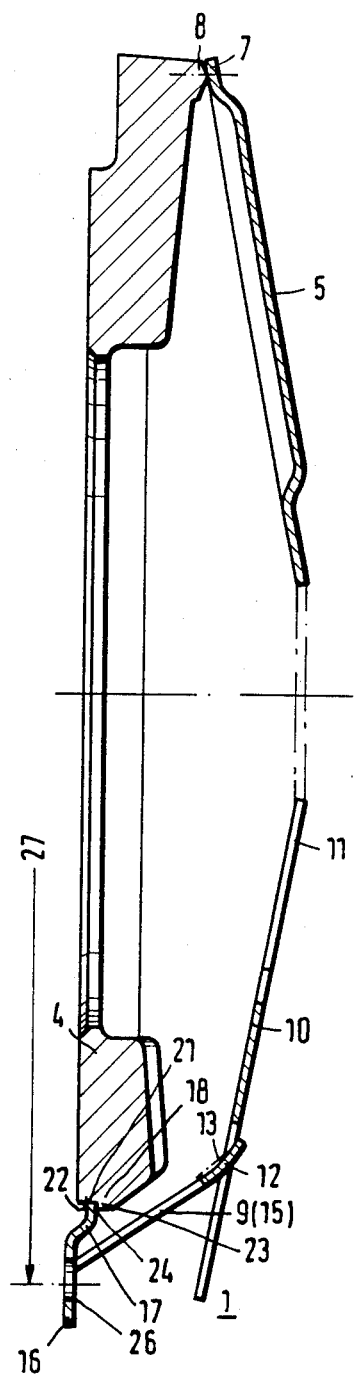

FRICTION CLUTCH

BACKGROUND OF THE INVENTION

The present invention relates to friction clutches, especially to improvements in friction clutches which can be used in motor vehicles. More particularly, the invention relates to improvements in friction clutches of the type wherein a diaphragm spring is employed to normally bear against a pressure plate and comprises a circumferentially complete annular main section, fingers which extend radially inwardly from the main section and can be used to effect tilting movements of the diaphragm spring, and outwardly extending prongs by means of which the diaphragm spring is connectable to a counterpressure plate, e.g., a flywheel. The connection between the prongs and the counterpressure plate is such that the diaphragm spring can be tilted in response to engagement of the fingers with the clutch disengaging or release means in order to permit a movement of the pressure plate away from a customary clutch plate which is interposed between the pressure plate and the counterpressure plate. Clutches of the above outlined character are disclosed, for example, in German patent applications Ser. Nos. P 32 34 156.3 and P 33 03 875.9.

OBJECTS AND SUMMARY OF THE INVENTION

An object of the invention is to provide a friction clutch whose operation is more satisfactory than that of the aforedescribed conventional friction clutches and which can be assembled in a simpler and more efficient and time-saving manner.

Another object of the invention is to provide a friction clutch which is constructed in such a way that the assembly of its parts is much simpler than in heretofore known friction clutches and that such simplification of assembly is achieved without the addition of any parts and without substantial and expensive modification of existing parts.

A further object of the invention is to provide a novel and improved method of holding the diaphragm spring of a friction clutch in a position of readiness when the diaphragm spring is not secured to its support, such as the flywheel of the engine in a motor vehicle.

An additional object of the invention is to provide the above outlined friction clutch with novel and improved means for facilitating assembly of the diaphragm spring with other parts of the friction clutch as well as dismantling of the friction clutch.

Another object of the invention is to provide a novel and improved arrangement for ensuring rapid attachment of the diaphragm spring to the flywheel in a friction clutch which is used in a motor vehicle or the like.

A further object of the invention is to provide a novel and improved diaphragm spring for use in a friction clutch of the above outlined character.

Another object of the invention is to provide a novel and improved pressure plate for use in the above outlined friction clutch.

An additional object of the invention is to provide a friction clutch which embodies the above outlined diaphragm spring and pressure plate.

The invention is embodied in a friction clutch, particularly for use in motor vehicles, which comprises a pressure plate, a counterpressure plate (e.g., the flywheel on the crankshaft of the engine of a motor vehicle), and a diaphragm spring which includes an annular main section, fingers extending substantially radially inwardly of the main section, and prongs which extend outwardly from the main section. The clutch further comprises means for separably securing the prongs to the counterpressure plate while the pressure plate is disposed between the diaphragm spring and the counterpressure plate. In accordance with a feature of the invention, the prongs and the pressure plate comprise means for separably holding the prongs in radially stressed condition subsequent or prior to separation of the prongs from the counterpressure plate. The arrangement is such that the holding means on the pressure plate and on the prongs hold the prongs against radially inward movement, i.e., toward the common axis of the diaphragm spring and the pressure plate. The holding means (e.g., suitably configurated lugs) of the prongs preferably bear directly against the holding means of the pressure plate when the diaphragm spring is detached from the counterpressure plate. The holding means of the prongs preferably extend radially or substantially radially inwardly to engage the holding means of the pressure plate when the prongs are separated from the counterpressure plate.

Each prong preferably includes an outer end portion which is remotest from the annular main section of the diaphragm spring and is normally affixed to the counterpressure plate by the aforementioned securing means, e.g., by a set of screws whose shanks extend through holes provided in the outer end portions of the prongs and into tapped holes provided in the counterpressure plate.

As mentioned above, the holding means of the prongs can include lugs which are provided on the outer end portions of the respective prongs (i.e., on the end portions which are connectable with the counterpressure plate) and can engage the holding means of the pressure plate.

Each prong can constitute or resemble a substantially V-shaped body with two mutually inclined legs which diverge away from each other in a direction away from the annular main section of the diaphragm spring. Each such prong further comprises a link which constitutes the aforementioned outer end portion and connects the radially outermost portions of the respective legs to each other. The lugs (holding means of the prongs) are then provided on the respective links and engage with the holding means of the pressure plate when the prongs are detached from the counterpressure plate. The lugs of the prongs preferably comprise stepped portions which are offset toward the annular main section, as considered in the axial direction of the clutch.

The holding means of the prongs and of the pressure plate are preferably designed and dimensioned in such a way that, when the diaphragm spring is detached from the counterpressure plate and the holding means of its prongs engage the holding means of the pressure plate, the diameter of the circle which is defined by the axes of tapped holes or bores in the counterpressure plate is the same as or does not appreciably deviate from the diameter of the circle which is defined by the axes of holes in the prongs while the lugs of the prongs engage the holding means of the pressure plate. As mentioned above, these holes are provided for reception of the shanks of screws which constitute the presently preferred means for separably securing the diaphragm spring to the counterpressure plate. Such dimensioning of the two holding means ensures that little time is lost for introduction of screws and for attachment of the diaphragm spring to the counterpressure plate when the clutch is to be assembled. The circumferentially extending portion of the pressure plate preferably constitutes or includes the respective holding means. The clutch further includes a clutch plate which is disposed between the pressure plate and the counterpressure plate and has a radially outermost portion whose diameter equals, approximates or is slightly less than the diameter of the holding means of the pressure plate.

The holding means of the pressure plate preferably comprises a circumferentially extending retaining surface portion or shoulder which faces away from the annular main section of the diaphragm spring and cooperates with the lugs (holding means) of the prongs to hold the diaphragm spring against excessive axial movement relative to the pressure plate and/or vice versa in a direction to increase the distance between the annular main section and the pressure plate.

The holding means of the pressure plate can constitute or include a circumferentially extending peripheral surface of the pressure plate. The aforementioned lugs on the outer end portions of the prongs then abut against such peripheral surface of the pressure plate to maintain the prongs in radially stressed condition as soon as the prongs are detached from the counterpressure plate. The peripheral surface of the pressure plate preferably includes an at least substantially cylindrical portion and an at least substantially radially outwardly extending portion which faces away from the main section of the diaphragm spring. The lugs (holding means) of the prongs can be designed in such a way that they abut against the cylindrical and radial portions of the peripheral surface of the pressure plate so as to ensure that the prongs are radially stressed as well as that the prongs hold the pressure plate and the diaphragm spring against excessive axial movement in a direction to increase the distance between the annular main section of the diaphragm spring and the pressure plate.

The holding means of the prongs and of the pressure plate allow for limited axial movements of the diaphragm spring and pressure plate relative to each other, upon separation of the prongs from the counterpressure plate, to predetermined mutual positions of the diaphragm spring and pressure plate. The clutch plate between the pressure plate and the counterpressure plate is subject to wear in engaged condition of the clutch so that the distance between the pressure plate and the counterpressure plate decreases in response to progressing wear upon the clutch plate, together with a reduction of possible axial movement of the diaphragm spring and pressure plate relative to each other. The holding means are designed to prevent total elimination of the possibility of axial movement between the pressure plate and the diaphragm spring, even when the clutch plate is subjected to maximum permissible wear.

The prongs of the diaphragm spring are spaced apart from the pressure plate when they are affixed to the counterpressure plate. If the securing means includes screws whose shanks are received in annuli of registering holes provided in the counterpressure plate and in the prongs, the holding means are arranged to prevent movement of the holes of the prongs out of substantial or exact register with the corresponding holes of the counterpressure plate upon removal of the screws and subsequent axial movement of the diaphragm spring and pressure plate axially of and relative to each other (the diaphragm spring is stressed when it is in engagement with the counterpressure plate and then causes the pressure plate to bear against the clutch plate except at such times when the disengaging means is operative to act upon the fingers of the diaphragm spring). In other words, the holding means of the pressure plate and diaphragm spring cooperate to ensure that the diameter of the annulus of holes in the prongs of the diaphragm spring does not change at all or does not change appreciably when the prongs are detached from the counterpressure plate and the diaphragm spring and pressure plate are thereupon caused to move axially relative to each other. As explained above, the holding means comprise means for limiting axial movements of the diaphragm spring and the pressure plate relative to each other in a direction to move the annular main section of the diaphragm spring away from the pressure plate. The limiting means can comprise at least one radially outwardly extending projection which is part of holding means of the pressure plate and can constitute a circumferentially complete or interrupted shoulder facing away from the annular main section of the diaphragm spring, or a series of discrete projections provided on and extending radially outwardly from the main portion of the pressure plate and alternating with additional projections which are provided on the pressure plate to abut against the diaphragm spring. The holding means of the prongs include extensions for engaging the projections of the holding means on the pressure plate in response to axial movement of the diaphragm spring and pressure plate relative to each other upon separation of the diaphragm spring from the counterpressure plate. The extensions can extend from the main portions of the prongs, as considered in the circumferential direction of the diaphragm spring. Each extension can overlie a discrete protuberance of the pressure plate.

The means for transmitting torque between the pressure plate and the diaphragm spring can comprise a set of leaf springs each of which can have one of its end portions connected to the adjacent prong of the diaphragm spring. More specifically, one end portion of each leaf spring can be connected to the extension of the respective prong. The extensions can be provided on the prongs in addition to the aforementioned lugs which form part of the holding means on the diaphragm spring.

Each extension can comprise a stepped portion which is offset in a direction toward the annular section of the diaphragm spring, as considered in the axial direction of the spring.

The prongs preferably include stiffening or reinforcing portions. Such reinforcing portions can be provided on the aforementioned outermost portions (links) of the prongs, i.e., in the regions of those portions which are separably secured to the counterpressure plate.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary plan view of a friction clutch which embodies the invention;

FIG. 2 is a sectional view as seen in the direction of arrows from the line II—II of FIG. 1, the diaphragm spring being shown in a position it assumes when it is secured to the counterpressure plate;

FIG. 3 illustrates the structure of FIG. 2 but with the diaphragm spring held by the pressure plate subsequent to its separation from the counterpressure plate; and FIG. 4 is a fragmentary sectional view as seen in the direction of arrows from the line IV—IV of FIG. 1.

DESCRIPTION OF THE PREFERRED EMBODIMENTS

The fully assembled friction clutch 1 is shown in FIGS. 1 and 2. It comprises a counterpressure plate 2, e.g., a flywheel which is driven by the engine of a motor vehicle and has tapped bores or holes 28 for screws 3 constituting a means for separably securing the other components of the friction clutch thereto. Such other or additional components include a pressure plate 4, a diaphragm spring 5 and a clutch plate 6 which is disposed between the plates 2, 4 and whose hub is mounted on and transmits torque to the input element of a change-speed transmission, not shown. The pressure plate 4 is movable axially between the diaphragm spring 5 and the flywheel 2 and is normally biased by the spring 5 against the clutch plate 6 so that the latter is clamped between the plates 2, 4 and receives torque from the former. Circumferentially spaced-apart portions 7 of the diaphragm spring 5 bear against the adjacent axially extending projections 8 of the pressure plate 4 to urge the latter toward and against the clutch plate 6. The reference characters 9 denote prongs which alternate with the aforementioned portions 7 of the diaphragm spring 5 and are separably secured to the counterpressure plate 2 by the aforementioned screws 3.

The diaphragm spring 5 comprises a circumferentially complete annular main section 10 which is integral with radially inwardly extending fingers 11. These fingers serve to tilt the spring 5 in a region 12 located radially inwardly of the projections 8 on the pressure plate 4 so as to relax the axial bias upon the pressure plate when the friction clutch is to be disengaged. The disengaging means can comprise a conventional bearing which is not shown in the drawing. At such time, the diaphragm spring 5 acts not unlike a two-armed lever, i.e., the fingers 11 and the prongs 9 pivot in the opposite directions with reference to the region 12 where the spring 5 is tilted in response to exertion of axial pressure against the inner end portions of the fingers 11.

The configuration of the prongs 9 is such that they are rigid, as considered in the axial direction of the clutch 1 so that they can take up the stresses which develop during disengagement of the friction clutch. The zone of transition between the prongs 9 and the annular main section 10 of the diaphragm spring 5 is indicated at 13. The zone 13 contains arcuate slots or cutouts 14 which are disposed radially inwardly of the region 12 and of the prongs 9.

Each of the prongs 9 comprises two mutually inclined legs 15 which diverge away from each other in a direction away from the annular section 10 and whose outer end portions are integrally connected to each other by a link 16 constituting the outer end portion of the respective prong 9. The links 16 have radially inwardly extending holding lugs 17 portions of which are axially offset relative to the outermost portions of the respective links 16.

FIG. 2 shows the manner in which the prongs 9 are separably secured to the counterpressure plate 2 by the aforementioned screws 3. The holes 28 of the counterpressure plate 2 are in register with holes 26 of the prongs 9, and such registering holes 26, 28 receive the shanks of the respective screws 3. The holding lugs 17 of the prongs 9 are adjacent to a stepped circumferentially extending holding portion 18 of the pressure plate 4 but are spaced apart from such holding portion irrespective of whether the clutch plate 6 is new or its linings have undergone a certain or an extensive amount of wear. When the linings of the clutch plate 6 have been subjected to a maximum permissible amount of wear, the left-hand side of the pressure plate 4 is located in the position which is indicated in FIG. 2 by broken lines, as at 19, and is still out of contact with the holding lugs 17 of the prongs 9 on the diaphragm spring 5. The reference character 20 denotes the clearance between the left-hand side of the pressure plate 4 and the nearest (radially innermost) portions of the holding lugs 17 on the prongs 9.

FIG. 3 shows the diaphragm spring 5 in a position it assumes relative to the pressure plate 4 after its separation from the counterpressure plate 2. It will be noted that the diaphragm spring 5 is shifted axially relative to the pressure plate 4 in such a way that the fingers 11 are more distant from the respective side of the pressure plate and that the holding lugs 17 of the prongs 9 engage the holding portion 18 of the pressure plate 4 in order to hold the prongs 9 in radially stressed condition. The radially innermost portions or tips 22 of the lugs 17 engage the holding portion 18 in the region where the at least substantially cylindrical portion 21 of its surface merges into the at least substantially rearwardly outwardly extending portion or shoulder 23 of such surface, i.e., where the two surface portions 21, 23 form a stop which holds the lugs 17 against further axial movement with reference to the pressure plate 4 in a direction to the right, as viewed in FIG. 3. The diameter of the cylindrical surface portion 21 equals or slightly exceeds the maximum diameter R of the friction linings on the clutch plate 6. The tips 22 of the holding lugs 17 bear against the cylindrical surface portion 21 whereby the latter prevents further radial inward movement of the prongs 9 and ensures that the prongs engage with the pressure plate 4 in prestressed condition in which the holes or openings 26 of the prongs 9 are in at least substantial register with the corresponding holes 28 of the counterpressure plate when the parts 2 and 5 are returned toward the positions of FIGS. 1 and 2 and the screws 3 are about to be applied to separably secure the diaphragm spring 5 to the counterpressure plate 2. The radial portion 23 of the surface of the holding portion 18 serves as a stop for the tips 22 and ensures that such tips are held in a predetermined axial position with reference to the pressure plate 4 when the latter serves as a temporary support or carrier for the diaphragm spring 5 preparatory to attachment of the diaphragm spring to the counterpressure plate or subsequent to detachment of the diaphragm spring from the counterpressure plate. The radially extending surface portion 23 is engaged by axially offset stepped portions 24 of the lugs 17; the stepped portions 24 are offset in a direction axially of the major portions of the prongs 9 and toward the annular main section 10 of the diaphragm spring 5. The provision of the radially extending portion 23 of the circumferential surface of the holding portion 18 is desirable and advantageous because this portion of the surface cooperates with the stepped portions 24 to prevent excessive stressing of torque transmitting leaf springs 25 which couple the diaphragm spring 5 to the pressure plate 4.

The reference characters 27 denote in FIGS. 2 and 3 the diameter of the circle including the axes of openings or holes 28 which are provided in the counterpressure plate 2 for the shanks of the screws 3. This diameter is the same as, or it does not appreciably deviate from, the diameter of the centers of holes 26 in the prongs 9 when the lugs 17 of such prongs are in engagement with the holding portion 18 of the pressure plate 4 in a manner as shown in FIG. 3. The holes 26 of the prongs 9 are provided in the links 16, i.e., in those portions of the prongs 9 which connect the radially outermost portions of the respective mutually inclined legs 15 to each other.

One of the aforementioned leaf springs 25 is shown in FIG. 4. The spring 25 couples the diaphragm spring 5 with the pressure plate 4 in such a way that the parts 4, 5 can move axially of one another but are compelled to share all angular movements about their common axis. The pressure plate 4 has radially outwardly extending protuberances 29, one for each leaf spring 25, and one end portion of each leaf spring 25 is affixed to the corresponding protuberance 29 by a rivet (see FIG. 4). The other end portion of each leaf spring 25 is riveted to one of the prongs 9, namely, to a projection or extension 30 of the respective prong. The rivet which connects the extension 30 to the leaf spring 25 of FIG. 4 is shown at 33. The extensions 30 extend laterally from the remainders of the respective prongs 9 (see FIG. 1) and each such extension has an offset element 31 which is spaced apart from the remainder of the extension 30, as considered in the axial direction of the diaphragm spring 5. The element 31 constitutes a stepped part of the extension 30. The radially extending protuberances 29 of the pressure plate 4 alternate with radially extending protuberances 32, and each of the protuberances 29, 32 carries or can carry a projection 8. The protuberances 32 are adjacent to the extensions 30 of the respective prongs 9 and can constitute stops for the diaphragm spring 5 if the aforementioned portion 23 of the surface of holding portion 18 is omitted. If desired, the extensions 30 of the prongs 9 can be circumferentially offset with reference to the illustrated positions so that the axes of the rivets 33 are moved from the positions corresponding to that of the rivet 33 shown in FIG. 4 to the positions one of which is indicated in FIG. 4 by a phantom line 34. In such modified clutches, the leaf springs 25 can be caused to abut against the protuberances 32 and to limit the extent of movement of the pressure plate 4 and diaphragm spring 5 axially and away from each other.

FIGS. 1 and 4 further show that the prongs 9 are provided with bent-over portions 35 which are adjacent to the respective links 16 and serve to stiffen or reinforce the respective portions of the prongs. Similar reinforcement can be achieved by the provision of substantially Z-shaped extensions 30 in the regions of their offset elements 31. The reinforcing action is effective in the circumferential direction in the region radially outwardly of the heads of the screws 3. This reduces the likelihood of undesirable deformation of the just discussed extensions of the prongs 9 in response to the action of forces which develop when the friction clutch is in use and, in the absence of adequate reinforcement of the prongs 9, could lead to insufficient axial movement of the pressure plate 4 away from the clutch plate 6 when the friction clutch is to be disengaged.

An important advantage of the improved friction clutch 1 is that the reassembly of the diaphragm spring 5 with the counterpressure plate 2 takes up little time and effort since the diameter 27 of the circle including the centers of holes 26 in the prongs 9 remains at least substantially unchanged when the holding lugs 17 of the prongs 9 bear against the cylindrical portion 21 of the peripheral surface of the holding portion 18 of the pressure plate 4. The prongs 9 tend to move radially inwardly but their radially inward movement is limited by the surface portion 21 so that they remain in optimum positions for reattachment to the counterpressure plate 2. It is possible to install discrete spacer elements between the lugs 17 and the surface portion 21; however, it is presently preferred to select the dimensions of the cooperating holding means 17, 18 on the diaphragm spring 5 and the pressure plate 4 in such a way that the lugs 17 engage directly with the surface portion 21 and also abut against the shoulder which is defined by the surface portion 23 to thus limit the extent of radial and axial movement of the prongs 9 relative to the pressure plate 4 and/or vice versa. The inner sides of the portions 22 of the lugs 17 bear against the surface portion 21 and the right-hand sides of such portions 22 abut against the surface portion 23 of the holding portion 18 when the parts 4 and 5 assume the positions which are shown in FIG. 3.

In the absence of the holding means 17, 18, a person attempting to attach the diaphragm spring 5 to the counterpressure plate 2 would be compelled to employ suitable spreading instrumentalities in order to flex the prongs 9 radially outwardly and to thus move the holes 26 in the links 16 of the prongs into register with the corresponding holes 28 of the counterpressure plate 2.

A further important advantage of the improved friction clutch 1 is that the holding means 17, 18 of the prongs 9 and pressure plate 4 cooperate in order to prevent excessive axial movements of the pressure plate 4 and the diaphragm spring 5 relative to each other. This could adversely influence the leaf springs 25, i.e., the means for transmitting torque between the diaphragm spring and the pressure plate.

The surface portion 23 of the holding portion 18 of the pressure plate 4 can be dispensed with if the means for limiting the extent of axial movement of the diaphragm spring 5 and pressure plate 4 relative to each other includes the aforementioned protuberances 32 i.e., parts which extend radially outwardly from the main body portion of the pressure plate 4. The protuberances 32 can constitute yokes, pins or plates which are inserted into or otherwise attached to the main body portion of the pressure plate 4. The same applies for the prongs 9, i.e., the prongs can be provided with pins, plates, yokes or analogous elements which limit the radial and/or axial movements of the prongs relative to the pressure plate 4 when the diaphragm spring 5 is detached from the counterpressure plate 2. The illustrated construction in which the lugs 17 of the prongs 9 cooperate with the surface portions 21, 23 to limit the radial and axial movements of the prongs relative to the pressure plate 4 and vice versa when the diaphragm spring 5 is detached from the counterpressure plate 2 is preferred at this time because it is simple and the holding means 17, 18 are compact and relatively inexpensive. The lugs 17 can be readily bent out of the general planes of the respective links 6, and the machining of the composite surface 21, 23 on the pressure plate 4 can be carried out in available machines.

An additional important advantage of the improved friction clutch is that the holding means 17, 18 can also serve to ensure that the pressure plate 5 does not come too close to the counterpressure plate 2 and hence into engagement with the lugs 17 while the prongs 9 are separably affixed to the counterpressure plate. This is achieved by suitably configurating the prongs 9 (as can be best seen in FIG. 2) so that the clutch plate 6 must be replaced (as a result of excessive wear upon its friction linings) before the clearance 20 is reduced to zero so that the surface portion 21 of the holding portion 18 of the pressure plate 4 could come into actual contact with the inner sides of the lugs 17. The wear upon the clutch plate 6 (as considered in the axial direction of the clutch 1) is due to wear upon the friction linings which are carried by the plate 6 and come into engagement with the plates 2 and 4 when the friction clutch is in use.

The lateral extensions 30 of the prongs 9 can be designed in such a way that they engage the left-hand side of the pressure plate 4 (as viewed in FIG. 3) when the screws 3 are removed and the parts 4 and 5 are caused to move axially relative to each other due to dissipation of energy which is stored in the diaphragm spring 5 while the prongs 9 are attached to the counterpressure plate 2. This could obviate the need for the shoulder or surface portion 23 on the pressure plate 4. In the embodiment which is shown in the drawing, the preferably stepped (as considered in the axial direction) extensions 30 overlie the corresponding protuberances 32 of the pressure plate 4. The stepped (substantially Z-shaped) extensions 30 reinforce or stiffen the respective prongs 9 in addition to or in lieu of the reinforcing portions 35. Uncontrolled flexing of the prongs 9 should be prevented because this could prevent the pressure plate 4 from becoming disengaged from the clutch plate 6 when the operator of the vehicle desires to disengage the friction clutch by exertion of a properly oriented force against the tips of the fingers 11.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, particularly for use in motor vehicles, comprising a pressure plate; a counterpressure plate; a diaphragm spring including an annular main section, fingers extending substantially radially inwardly of said section, and prongs extending outwardly from said section; and means for separably securing said prongs to said counterpressure plate with said pressure plate disposed between said diaphragm spring and said counterpressure plate, said prongs and said pressure plate comprising means for holding said prongs in radially stressed condition subsequent to separation of said prongs from or prior to attachment of said prongs to said counterpressure plate.

2. The clutch of claim 1, wherein said counterpressure plate includes a flywheel.

3. The clutch of claim 1, wherein the holding means of said pressure plate is arranged to resist the tendency of said prongs to move inwardly in the radial direction of said annular section.

4. The clutch of claim 1, wherein the holding means of said prongs are arranged to bear directly against the holding means of said pressure plate upon separation of such prongs from said counterpressure plate.

5. The clutch of claim 1, wherein the holding means of said prongs include substantially radially extending portions which engage the holding means of said pressure plate upon separation of said prongs from said counterpressure plate.

6. The clutch of claim 1, wherein each of said prongs has an outer end portion remote from said annular section and said securing means is arranged to attach said outer end portions to said counterpressure plate, said outer end portions including the holding means of said prongs and being arranged to engage with the holding means of said pressure plate upon separation of said prongs from said counterpressure plate.

7. The clutch of claim 1, wherein the holding means of said prongs include substantially radially inwardly extending lugs engageable with the holding means of said pressure plate.

8. The clutch of claim 7, wherein said prongs include outer end portions which are connectable with said counterpressure plate and said lugs form part of such outer end portions.

9. The clutch of claim 1, wherein each of said prongs is substantially V-shaped and includes two legs which diverge away from each other in a direction away from said annular section, each of said prongs further comprising a link which is remote from said annular section and connects the respective legs to one another.

10. The clutch of claim 9, wherein each of said links comprises a substantially radially inwardly extending lug which constitutes the holding means of the respective prong and is engageable with the holding means of said pressure plate when said prongs are detached from said counterpressure plate.

11. The clutch of claim 10, wherein said lugs comprise portions which are offset toward said annular section in the axial direction of the clutch.

12. The clutch of claim 1, wherein said securing means comprises screws and said prongs have holes registering with holes provided in said counterpressure plate and arranged to receive the shanks of the screws, said holding means being arranged to maintain the holes of said prongs in at least substantial register with the holes of said counterpressure plate upon removal of said screws.

13. The clutch of claim 1, wherein said pressure plate has a circumferentially extending portion which includes the holding means.

14. The clutch of claim 13, further comprising a clutch plate between said pressure plate and said counterpressure plate, said clutch plate having a radially outermost portion whose diameter at least approximates that of the holding means of said pressure plate.

15. The clutch of claim 14, wherein the diameter of said radially outermost portion of said clutch plate is slightly less than the diameter of the holding means of said pressure plate.

16. The clutch of claim 1, wherein said pressure plate has a circumferentially extending surface portion facing away from said annular section and forming part of the holding means, said prongs including end portions arranged to abut against said surface portion upon separation of said prongs from said counterpressure plate.

17. The clutch of claim 1, wherein the holding means of said pressure plate includes a peripheral surface on said pressure plate and the holding means of said prongs have end portions abutting against said surface upon separation of such prongs from said counterpressure plate.

18. The clutch of claim 17, wherein said surface includes an at least substantially cylindrical portion and an at least substantially radially outwardly extending portion.

19. The clutch of claim 1, wherein said prongs include end portions which are connectable with said counterpressure plate by said securing means, the holding means of said prongs including means for locating said spring radially and axially with reference to said pressure plate in cooperation with the holding means of said pressure plate upon separation of said prongs from said counterpressure plate.

20. The clutch of claim 1, wherein said holding means are arranged to permit limited axial movements of said diaphragm spring and said pressure plate relative to each other upon separation of said prongs from said counterpressure plate to predetermined mutual positions of said diaphragm spring and said pressure plate, and further comprising a clutch plate interposed between said pressure plate and said counterpressure plate and being subject to wear during engagement and disengagement of the clutch so that the distance between the pressure plate and the counterpressure plate decreases in response to progressing wear upon said clutch plate together with a reduction of possible axial movements of said diaphragm spring and said pressure plate relative to each other, said holding means being arranged to permit axial movement between said pressure plate and said diaphragm spring, even when said clutch plate is subjected to maximum permissible wear.

21. The clutch of claim 1, wherein the holding means of said pressure plate and said prongs are spaced apart from each other in the axial direction of the clutch, when said diaphragm spring is secured to said counterpressure plate.

22. The clutch of claim 21, wherein said securing means includes screws having shanks which are received in annuli of holes provided therefor in said counterpressure plate and in said prongs, said diaphragm spring being arranged to move axially and away from the counterpressure plate upon removal of said screws and said holding means being arranged to maintain the diameter of the annulus of holes in said prongs at least substantially unchanged subsequent to separation of said prongs from said counterpressure plate and while the holding means of said prongs engage the holding means of said pressure plate.

23. The clutch of claim 22, wherein said holding means include means for limiting the axial movement of said diaphragm spring relative to said pressure plate and/or vice versa in a direction to move said annular section away from said pressure plate.

24. The clutch of claim 23, wherein the limiting means of the holding means of said pressure plate comprises at least one radially outwardly extending protuberance and the holding means of said prongs includes means for engaging such protuberance on axial movement of the diaphragm spring and pressure plate relative to each other upon separation of said diaphragm spring from said counterpressure plate.

25. The clutch of claim 24, wherein said engaging means of the holding means of said prongs comprises extensions provided on said prongs.

26. The clutch of claim 24, wherein said prongs include main portions and said extensions extend from said main portions in the circumferential direction of said diaphragm spring.

27. The clutch of claim 26, wherein each of said extensions overlies a discrete protuberance of said pressure plate.

28. The clutch of claim 25, further comprising means for transmitting torque between said diaphragm spring and said pressure plate, said torque transmitting means being affixed to said extensions.

29. The clutch of claim 28, wherein said torque transmitting means comprises leaf springs.

30. The clutch of claim 25, wherein the holding means of each of said prongs further comprises a link and said links are axially offset relative to the extensions.

31. The clutch of claim 30, wherein each of said extensions has a stepped portion which is offset in a direction toward said annular section in the axial direction of said diaphragm spring.

32. The clutch of claim 1, wherein said prongs include stiffening portions.

33. The clutch of claim 32, wherein said prongs include radially outermost portions and said stiffening portions are disposed in the regions of such radially outermost portions.

34. The clutch of claim 33, wherein said securing means is arranged to secure the radially outermost portions of said prongs to said counterpressure plate.

* * * * *